Oct. 12, 1926.
H. W. PLEISTER ET AL
1,602,503
DRIVE RING
Filed August 6, 1924
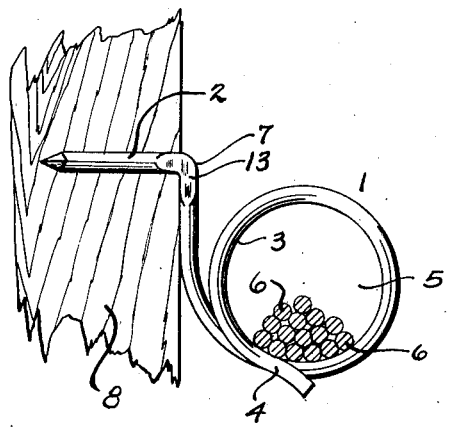
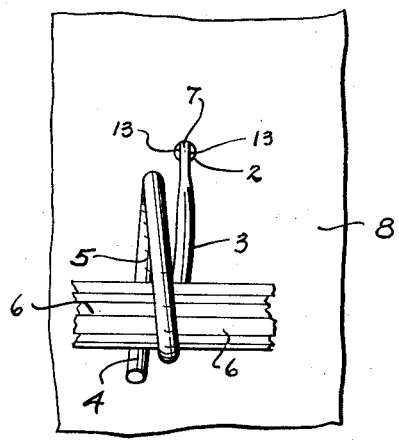
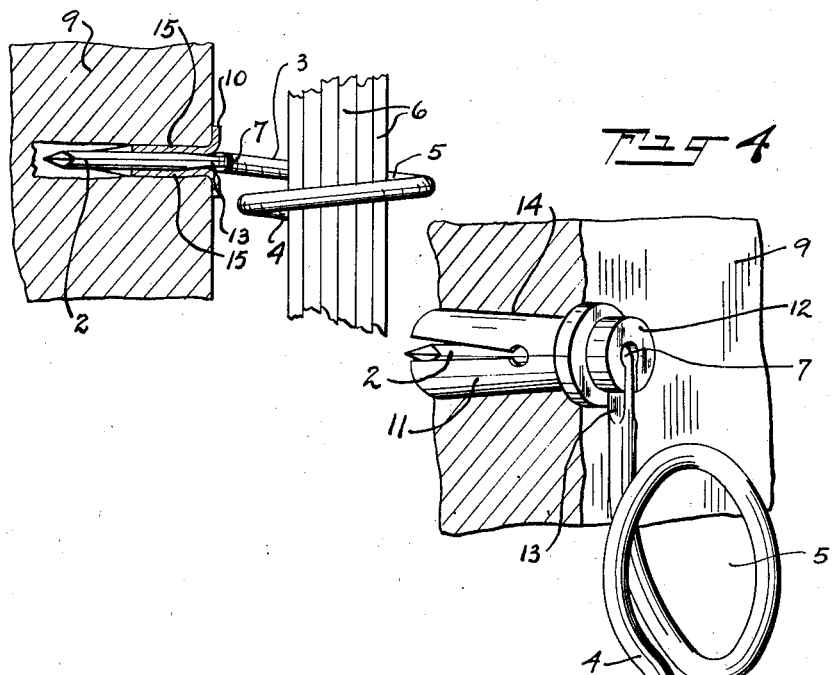

Patented Oct. 12, 1926.

1,602,503

UNITED STATES PATENT OFFICE.

HENRY W. PLEISTER, OF WESTFIELD, AND FRED KARITZKY, OF GARWOOD, NEW JERSEY, ASSIGNORS TO HENRY B. NEWHALL, OF PLAINFIELD, NEW JERSEY.

DRIVE RING.

Application filed August 6, 1924. Serial No. 730,367.

Our invention relates to drive rings used more particularly as supports for telephone and telegraph wires. Our invention further relates to a drive ring having an integral pigtail and nail portion.

Our invention further relates to such a drive ring formed from wire, and in which the junction of the pigtail and nail portion is strengthened, in any suitable manner, such as by swaging, or otherwise, to prevent the drive ring bending at this point; and also to form a non-circular portion, which will prevent the drive ring rotating in the wall or other suitable support.

Our invention further relates to the combination of such a drive ring and an expansion with which it cooperates.

Our invention further relates to certain articles of manufacture, combinations and sub combinations, and details of construction, all of which will be more fully hereinafter described and pointed out in the claims.

In the drawings the same reference numerals refer to similar parts in the several figures.

Fig. 1 is a vertical section through a wooden support, into which the integral drive ring has been driven, the drive ring being shown in side elevation;

Fig. 2 is a front elevation of the drive ring shown in Fig. 1;

Fig. 3 is a horizontal section through a nail expansion showing our drive ring in combination with one form of nail expansion;

Fig. 4 is a vertical section through a wall or other suitable support, showing a ductile anchor in combination with our drive ring, the expansion and drive ring being in perspective.

Our drive ring 1 is preferably formed from round wire and bent to form a nail portion 2 and a pigtail portion 3, the end 4 of the wire being bent back upon itself to form a substantially closed loop 5, within which are supported a plurality of drop or messenger wires 6, 6.

We strengthen the junction 7, of the nail portion 2 and the pigtail portion 3, in any suitable manner, so that in driving the nail portion within the wall or other suitable support 8, the drive ring will not bend at this point. This may be done in various ways. Preferably we strengthen the drive ring at this point by swaging or compressing the metal to form a noncircular portion 13. It is found in practice that when this junction point is so strengthened there will be no bending of the nail portion with relation to the pigtail, or vice versa. If an unusual load is placed on the drive ring after it is driven home, such as by a lineman supporting himself by grasping the drop or messenger wires 6, 6, while he stands on a ladder, the drive ring will not bend or straighten out at this point.

When the wall or other suitable support 8, is of wood, plaster board, asbestos block or other relatively soft material, the nail portion 2 can be driven directly into the wall, as shown in Figs. 1 and 2. When the wall 9 is of stone, brick, concrete, or some other hard material, we preferably use our drive ring in combination with a nail expansion, such for example, as 10 (Fig. 3). In driving the nail portion 2 within the nail expansion 10, a large part of the flattened or noncircular part 13, is driven into the nail expansion 10, between its sides 15, 15 and will prevent the drive ring rotating within the nail expansion.

We may also use our drive ring in combination with a ductile anchor 11 (Fig. 4) formed of lead, alloy or similar material, which is previously mounted in the hole 14 in the wall 9 of brick, concrete or other hard material. Preferably this ductile anchor 11 is provided with a ductile head 12, so that when the nail portion 2 is driven within the ductile expansion, a part of the flattened surface 13 acts as a knife and cuts its way through the head 12, as shown in Fig. 4. This insures that the nail portion 2 will not only expand the ductile anchor 11, but that a part of the flattened portion 13 will cooperate with the head 12, so that the drive ring cannot be rotated within the expansion.

It will, therefore, be seen that our drive ring may be used alone, or in combination with an expansion, which expansion may be formed either of hard or ductile material.

Having thus described this invention in connection with an illustrative embodiment thereof, to the details of which we do not de- sire to be limited, what is claimed as new and what is desired to secure by Letters Patent is set forth in the appended claims.

What we claim is:—

1. A new article of manufacture comprising an angular drive ring having a horizontal nail portion and an integral pigtail portion, the juncture of the nail portion and the pigtail portion being swaged and flattened to form a noncircular strengthened portion, the entire pigtail portion extending transversely from and entirely below the nail portion and adapted to support runs of telephone bridle or drop wires.

2. The combination of a nail expansion having a head and a drive ring formed of wire having an integral pigtail and nail, a portion of the drive ring being swaged and seated in the notch formed by it in the head of the expansion to prevent the rotation in either direction of the drive ring in the expansion.

HENRY W. PLEISTER.
FRED KARITZKY.